April 12, 1932.  L. A. PARADISE ET AL  1,853,176
CORN PICKING MACHINE
Filed Dec. 24, 1927   2 Sheets-Sheet 1
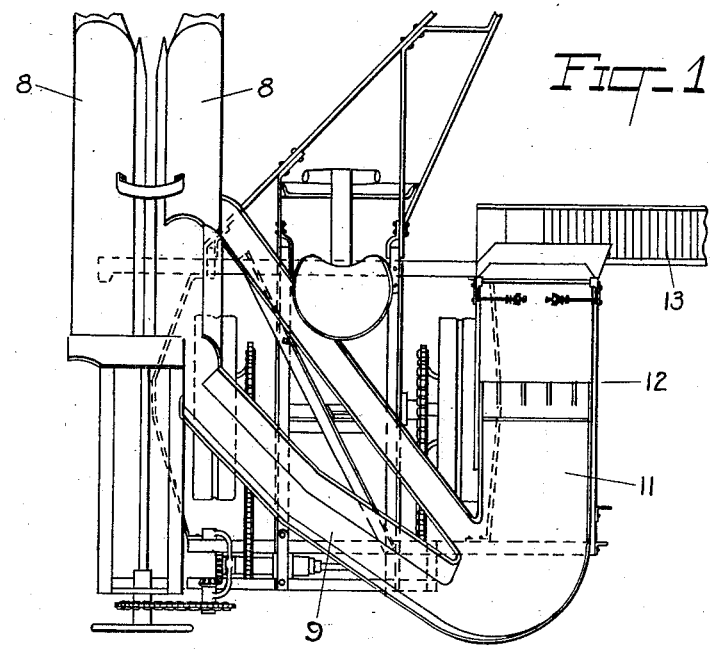
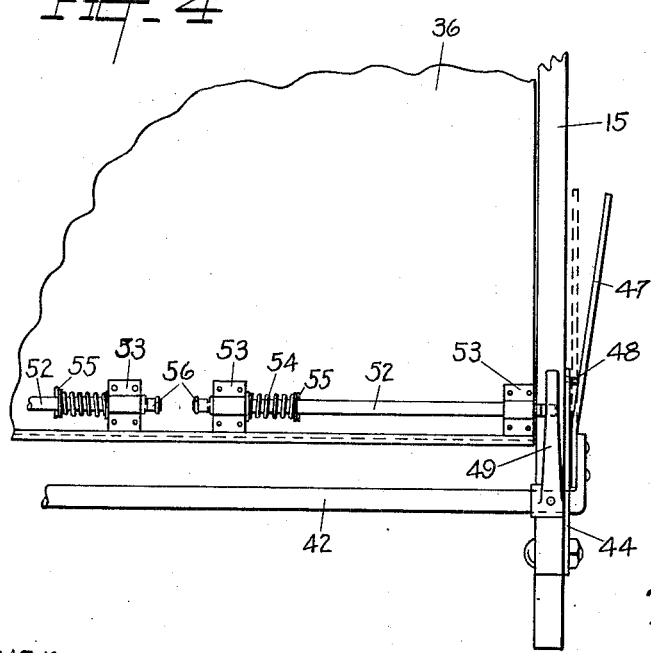
Witness
A. D. McLay
Inventors
Louis A. Paradise,
Wilbur J. Coultas,
by Brown, Jackson, Boettcher & Dienner
Attorneys

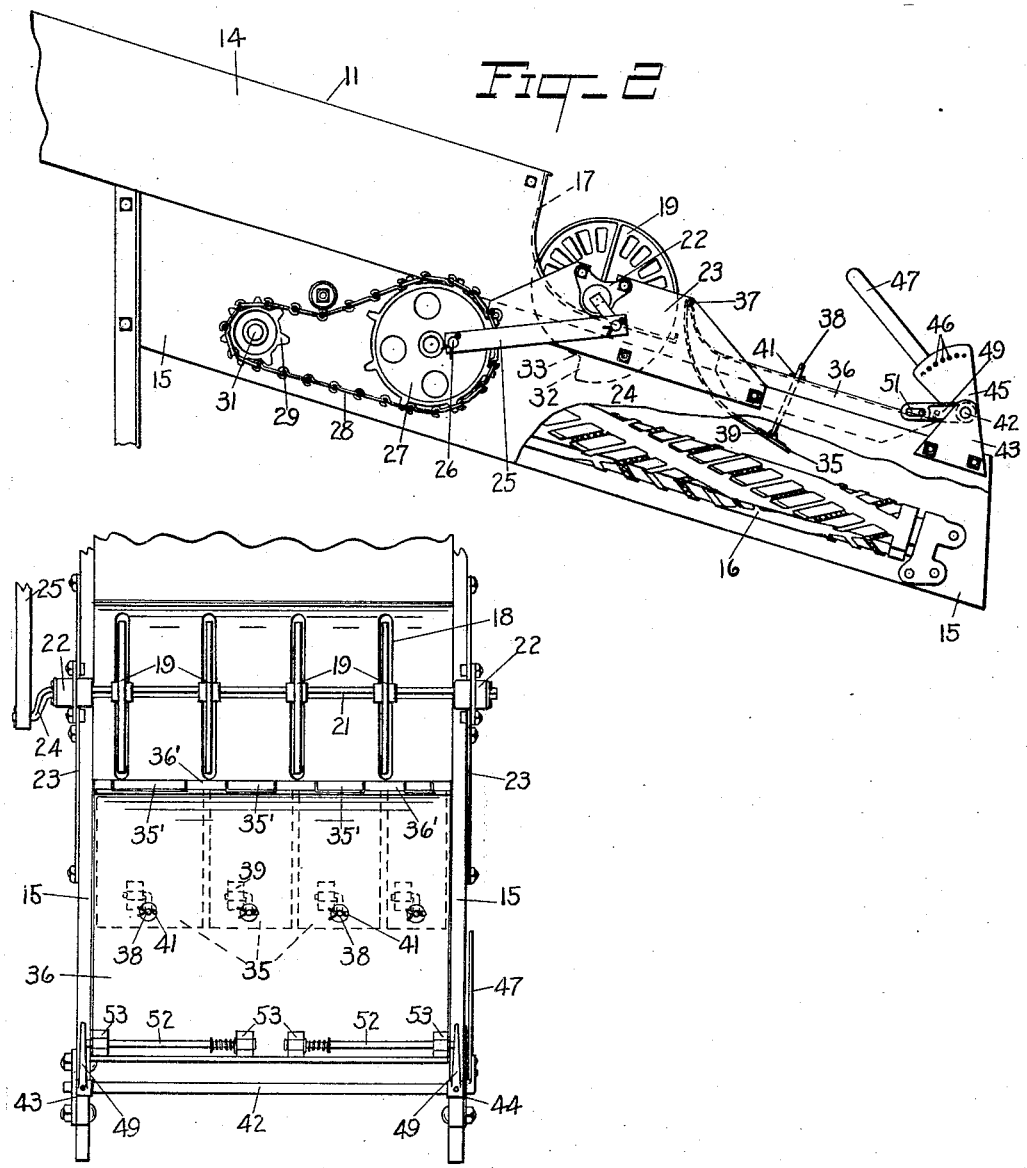

Patented Apr. 12, 1932

1,853,176

UNITED STATES PATENT OFFICE

LOUIS A. PARADISE AND WILBUR J. COULTAS, OF MOLINE, ILLINOIS, ASSIGNORS TO DEERE & COMPANY, OF MOLINE, ILLINOIS, A CORPORATION OF ILLINOIS

CORN PICKING MACHINE

Application filed December 24, 1927. Serial No. 242,370.

The present invention pertains to machines designed for picking the ears of standing corn and husking these ears as a continuous operation, and is concerned primarily with improvements in the husking mechanism of such implements.

More particularly, it is one of the objects of the invention to provide an improved construction of alining mechanism for guiding the ears of corn into proper relation to the husking rolls. Such alining mechanism comprises a series of wheels having a certain unique construction and operating motion.

Another object of the invention is to provide an improved construction of retarding mechanism, which serves to control the travel of the ears of corn along the husking rolls, and to hold said ears to the rolls.

The preferred construction in which these improvements reside will now be described in connection with the accompanying drawings wherein:

Fig. 1 is a fragmentary plan view of the present implement.

Fig. 2 is a fragmentary side elevational view of the husking mechanism, a portion of such figure being broken away.

Fig. 3 is a plan view of the husking mechanism; and

Fig. 4 is a similar view on a larger scale showing the latch rods for the cover in detail.

Fig. 1 is intended merely to show the general relation of the corn husking mechanism with respect to the other parts of the implement. In the conventional corn picker, the corn stalks are guided between gatherer arms 8 at the left side of the machine, where the ears are snapped from the stalks by the well known snapping rolls which extend along the inner sides of the arms 8. As the ears are snapped from the stalks they fall into the path of an elevator 9 which conveys the ears upwardly and to the right side of the machine for discharge into a long hopper 11 which constitutes part of the husking mechanism 12. After the ears have been husked by such mechanism they are usually discharged to a wagon conveyor 13 which carries them upwardly and dumps them into a wagon traveling alongside the corn picking implement.

Referring now to the general construction of the husking mechanism, it will be seen from Figs. 2 and 3 that the hopper or chute 11 comprises side walls 14 which rest on lower side walls 15, the latter constituting part of a frame for the husking rolls 16. These rolls are arranged in pairs between the side walls 15, inclining downwardly, and having bearing support at their upper and lower ends in suitable bearing members carried by the frame structure of the husking mechanism. Such rolls have the usual arrangement of ribs and pegs for stripping the husks from the ears, which need not be described in detail as the general construction and operation of the rolls is well known.

The ears of corn in sliding down through the chute or hopper 11 must be alined with the rolls in order that the latter can have the proper action thereon for stripping the husks from the ears. The lower end of such chute or hopper is closed by a shield or wall 17 which curves forwardly to guide the ears down onto the rolls. Disposed in slots 18 in the curved portion of this wall are a plurality of alining wheels 19 which function to guide or direct the ears so that they will follow down along the upper sides of the rolls 16 in parallelism therewith. Such wheels are mounted on a transversely extending shaft 21 which is mounted in bearings 22 carried by brackets or side plates 23 which are secured to the side walls 15 of the frame. The outer end of the shaft 21 is bent radially and then laterally to form a crank 24. The alining wheels 19 are given an oscillatory motion through the crank 24, which has pivotal connection with one end of a pitman or connecting rod 25, the other end of such connecting rod having a crank pin connection 26 with a sprocket wheel 27. The latter is driven by a chain 28 from the sprocket wheel 29 on a drive shaft 31, such drive shaft being operatively connected to the driving parts of the implement for rotation when the implement is in operation.

As shown in Fig. 2, each alining wheel 19 is provided with a radially extending rearwardly facing shoulder 32 which projects downwardly from the lower portion of the wheel. Such shoulder is preferably formed by constructing each wheel with a spirally shaped periphery. The shoulders on the several wheels oscillate to and fro, along the line of travel of the ears, in the space defined between the husking rolls 16 and the end shield or wall 17. It will be understood that the alining wheels are spaced laterally from each other a distance slightly greater than the thickness of a large ear of corn. Such ears as slide downwardly in the hopper 11 with one end of the ear pointing downwardly substantially in parallelism with the husking rolls are free to pass between the alining wheels, the space between said wheels corresponding in alinement with the troughs between cooperating rolls, whereby these ears are guided into proper relation on the rolls. Such ears as slide to the bottom of the hopper 11 crosswise thereof, encounter the alining wheels 19. The oscillatory motion of the wheels results in the shoulders 32 striking such crosswise ears and kicking the same rearwardly. The ears which are thus engaged by the shoulders 32 will be thrown back repeatedly until such ears have become alined with the spaces between the wheels, whereupon said ears will be free to pass between the wheels and down along the upper surfaces of the rolls, in parallelism therewith.

It will be observed that by providing each wheel with the shoulder 32, and by imparting an oscillatory or to and fro motion to such shoulders, the crosswise ears will be continuously agitated until they have become alined with the spaces between the wheels. The oscillatory motion of the wheels, and the short radial dimension of that portion of the wheel periphery directly in advance of the shoulder 32, designated 33, prevents any possibility of the crosswise ears becoming wedged under the wheels and thus forced downwardly past the wheels in non-parallel relation to the rolls.

After the ears have moved down past the alining wheels 19 they come under the restraint of a series of retarding plates or shoes 35. Such plates retard the speed of travel of the ears along the rolls, and prevent the ears, particularly the lighter ones, from bobbing up and down on the rolls, which would prevent the ribs and pegs on the rolls from effectively engaging the husks. A cover 36 is disposed over the rolls, extending downwardly from a hinge rod 37 directly in rear of the alining wheels 17, and extending laterally to cover substantially the entire space between the side walls 15. The upwardly curved front edge of the cover is hinged on the rod 37, the ends of which are mounted in the side plates 23. This upwardly curved or flared forward end of the cover forms what may be termed a hopper. The retarding plates 35 are grouped or arranged with each plate alined with the feeding space between adjacent alining wheels 19, as indicated in dotted lines in Fig. 3. The forward ends of such plates are curved upwardly, having substantially the same curvature as the curved forward end of the cover, and have hinged mounting on the pivot rod 37, the looped portions 35' which receive the rod 37 being disposed between the looped portions 36' of the cover, as shown in Fig. 3. The rear ends of the retarding plates 35 hang suspended from the cover 36 through supporting rods 38, which have angularly bent lower ends pivotally connected to clips or brackets 39 secured to the upper sides of the plates 35. The upper ends of the rods 38 extend slidably through openings in the cover 36, and carry stop pins or shoulders 41 which are adapted to engage the upper side of the cover and thereby limit the downward movement of the rear ends of the retarding plates.

Adjusting means is provided for raising or lowering the free end of the cover 36, and thereby raising or lowering the normal position of the retarding plates 35 with respect to the rolls 16. Such adjusting means comprises a shaft 42 which extends transversely across the frame of the husker mechanism, and which has bearing support in brackets 43 and 44 secured to the side frame members 15. The bracket 44 is formed with an upwardly extending segment 45 in which are provided a series of latching holes 46. An adjusting lever 47 is secured to the corresponding end of the shaft 42 and has a detent pin 48 (Fig. 4) projecting laterally therefrom for engaging selectively in the holes 46. Such lever has sufficient spring to permit the latching pin to be withdrawn from one of these holes by flexing the lever sidewise, thereby permitting the lever to be rocked when it is desired to make an adjustment of the cover 36. Pinned to the shaft 42, directly on the inner sides of the bearing brackets 43 and 44, are two arms 49 which extend toward the cover and which have longitudinal slots 51 in their end portions. The cover is detachably connected to such arms through the instrumentality of latch rods 52 which are mounted on the upper side of the cover adjacent to its swinging end. Referring to Fig. 4, each rod is mounted for endwise sliding movement in a pair of brackets or clips 53 which are secured to the cover. A light compression spring 54 is mounted on each of these rods, and is confined between the innermost bracket 53 and a transverse pin 55 carried by the rod, such spring normally tending to hold the outer end of the rod in the slot 51 of the adjusting arm 49. The inner ends of the rods 52 have upwardly extending finger grips or handle portions 56, through which the rods can be drawn inwardly towards each other for retracting their outer ends from the slots 51 in the arms 49.

As previously remarked, the retarding plates 35 function to retard the travel of the ears along the rolls and to hold the ears pressed downwardly against the rolls so that they will not tend to bob up and down thereon. It will be understood that each retarding shoe is free to swing upwardly as an ear of corn passes under the same, the rod 38 sliding freely in its hole in the cover 36. It is frequently desirable to adjust the spacing between such retarding plates and the upper surfaces of the rolls, as when harvesting ears of relatively large or small size. Such adjustment is readily afforded through the adjusting lever 47, the operation of said lever rocking the shaft 42 and raising or lowering the free end of the cover 36. It will be understood that the stop pins 41 carried by the supporting rods 38 serve to hold the retarding plates clear of the rolls 16, even with the lever 47 in its lowest position of adjustment.

It is frequently desirable to obtain access to the husking rolls 16 for cleaning out husks and other trash, or for removing an ear which may have become jammed in the husking mechanism. The range of adjusting movement of the cover 36 is insufficient to afford easy access to the rolls, but such access can be quickly obtained by releasing the two latch rods 52 from the slots 51 in the adjusting arms 49. This permits the cover 36 together with the retarding plates 35 to be swung upwardly and backwardly over the alining wheels 19, thus exposing the entire upper surfaces of all of the rolls 16.

We claim:

1. The combination with a husking implement comprising a supporting frame and a plurality of husking rolls, of a plurality of retarding members pivotally connected with said frame and adapted to engage the ears of corn as they travel along said rolls, a common supporting member pivotally connected at one end with said frame, for supporting said retarding members, said retarding members swinging about a pivotal axis on said frame independent of said supporting member, and means cooperating with said supporting member for holding the latter and said retarding members in different positions of adjustment relative to said rolls.

2. The combination with a husking implement comprising a supporting frame and a plurality of husking rolls, of a cover extending over said rolls and pivotally supported by said frame so as to be capable of swinging upwardly to afford access to said rolls, and a retarding member pivotally connected with said frame to swing about a transverse axis and yieldingly connected with said cover and adjustable therewith, for retarding the travel of the ears of corn along said rolls.

3. The combination with a husking machine comprising a supporting frame and a plurality of husking rolls, of a cover hinged at one end to said frame and having its free end portion extending over said rolls, a plurality of retarding plates hinged to said frame and movably connected with the free end portion of said cover to retard the travel of the ears of corn along said rolls, adjusting means for holding said cover in different elevated positions relative to said rolls, and means for detachably connecting said cover to said adjusting means, whereby said cover and said retarding plates can be swung upwardly to afford access to said rolls.

4. The combination with a husking implement comprising a supporting frame and a plurality of husking rolls, of a cover pivotally connected at one end with said frame to swing about a fixed axis on said frame and supported over said rolls, a plurality of retarding plates pivotally mounted at one end to move relatively to said cover and adapted to engage the ears of corn as they travel along said rolls, adjusting mechanism for raising and lowering one end of said cover relative to said rolls, means connecting said retarding plates with said cover to move upwardly and downwardly therewith and means for detachably connecting said cover to said adjusting mechanism, whereby said cover can be disengaged therefrom to permit the cover and retarding plates to be swung upwardly for affording access to said rolls.

5. In a machine of the class described, the combination with a supporting frame, and husking mechanism comprising a plurality of husking rolls, of a cover extending over said rolls and having hinged mounting at one end on said frame, a plurality of retarding plates pivotally mounted at one end below said cover, supporting rods spaced from the pivotal axis of the plates on the cover and extending between said plates and said cover for limiting the downward movement of said plates relatively thereto, and means for holding the other end of said cover in different elevated positions relative to said rolls.

6. In a machine of the class described, the combination with the frame and a plurality of husking rolls supported thereby, of a cover extending over said rolls and having hinged mounting at one end on said frame, a plurality of retarding plates underlying the cover and mounted to swing therewith and move relatively thereto, rods extending between said retarding plates and said cover for limiting the downward movement of said plates relatively to said cover, and adjusting arm for raising or lowering the other end of said cover, detent means for holding said arm in its different positions of adjustment, and means for detachably attaching said cover to said arms to permit said cover and said retarding plates to be folded upwardly and backwardly independently of said arm to a position approximately at right angles to said rolls.

7. The combination with a husking implement comprising a frame and a plurality of husking rolls supported thereby, of a cover disposed over said rolls and having one end pivotally mounted on said frame, a plurality of retarding plates underlying the cover and mounted to swing therewith and move relatively thereto, to engage the ears of corn as they travel along said rolls, rods connected to said plates and having cooperation with said cover for limiting the downward movement of said plates relatively to said cover, a shaft pivotally mounted on said frame, arms extending from said shaft and having operative connection with the other end of said cover for raising and lowering the same, an adjusting lever for rocking said shaft, and detent means for holding said lever in its different positions of adjustment.

8. The combination with a husking machine comprising a frame and a plurality of husking rolls carried thereby, of a cover extending over said rolls, a hinge rod supported on said frame, one end of said cover being pivotally mounted on said hinge rod, a plurality of retarding plates disposed below said cover and adapted to engage the ears of corn as they travel along said rolls, one end of each of said plates being pivotally mounted on said hinge rod, supporting rods pivotally connected to the other end portions of said retarding plates and extending upwardly through openings in said cover, shoulders carried by said supporting rods and adapted to engage said cover to limit the downward movement of said retarding plates relatively to said cover, a shaft extending transversely of said rolls and pivotally supported on said frame, an adjusting lever for rocking said shaft, detent means cooperating with said lever for holding the latter in its different positions of adjustment, a pair of arms extending from said shaft, said arms having slots in their outer ends, and a pair of spring pressed latch rods mounted on the swinging end of said cover and adapted to engage in the slots in said arms, said latch rods being releasable therefrom to permit said cover and said retarding plates to be swung upwardly beyond the range of adjusting movement of said arms to afford access to said rolls.

9. The combination with a husking implement comprising husking mechanism, of means for guiding the ears of corn to said husking mechanism comprising a plurality of laterally spaced alining wheels having downwardly projecting shoulders for engaging the ears, and means for oscillating said wheels to move the shoulders thereof to and fro along the line of travel of the ears.

10. The combination with a husking machine comprising husking mechanism, of means for guiding the ears of corn to said husking mechanism comprising a plurality of laterally spaced alining wheels, between which the ears are adapted to pass, said wheels having forwardly facing shoulders extending downward substantially radially thereof, and means for oscillating said wheels to move the shoulders thereof to and fro along the line of travel of the ears.

11. The combination with a husking machine comprising husking rolls, of means for guiding the ears of corn to said rolls comprising a plurality of laterally spaced alining wheels, said wheels having spirally shaped peripheries forming downwardly extending forwardly facing shoulders adapted to kick back any ears not alining with said rolls, and crank means for oscillating said wheels to move the shoulders thereof to and fro along the line of travel of the ears.

12. In a machine of the class described, the combination with a plurality of husking rolls and a hopper for directing the ears of corn to said rolls, said hopper comprising an end wall, of a transversely extending shaft mounted above said rolls, laterally spaced alining wheels mounted on said shaft and disposed in openings in said end wall, each of said wheels having a downwardly extending forwardly facing shoulder adapted to kick back any ear not in substantial parallelism with said rolls, a crank on said shaft, and means for imparting oscillatory motion to said crank to move said shoulders to and fro along the line of travel of the ears.

13. The combination with a husking implement comprising a supporting frame and husking rolls, of a plurality of laterally spaced alining wheels between which the ears of corn are adapted to pass to said husking rolls, said wheels having rearwardly facing downwardly extending shoulders for engaging the ears to compel the latter to aline with said rolls, means for oscillating said wheels to move said shoulders to and fro along the line of travel of the ears, a cover extending over said rolls and pivotally mounted to permit the cover to be swung backwardly over said alining wheels, a plurality of retarding plates pivotally connected with said frame and yieldingly supported by said cover to engage the ears of corn as they travel along said rolls, and means for holding said cover in different elevated positions of adjustment relative to said rolls.

14. The combination with a husking implement comprising a supporting frame and a plurality of husking rolls, of a cover pivotally connected with said frame to swing toward and from said husking rolls and adjustably supported over said rolls, means for holding said cover in its different positions of adjustment, a plurality of rearwardly extending retarding plates underlying the cover and mounted to swing therewith and to move relatively thereto, and means yieldingly connecting the rear end portions of said plates with said cover whereby said plates may engage the ears of corn as they travel along said rolls.

15. The combination with a husking implement comprising a supporting frame and a plurality of husking rolls, of a cover disposed over said rolls and pivotally connected at one end with said frame to swing vertically, a plurality of retarding plates pivoted directly to said supporting frame about an axis extending in the same direction as the pivotal axis of the cover and adjustable with the cover, said plates being adapted to yieldingly engage the ears of corn as they travel along said rolls, and adjusting mechanism for holding said cover in different positions relative to said rolls.

16. The combination with a husking implement comprising a supporting frame and a plurality of husking rolls, of a cover extending over said rolls, and a plurality of retarding members positioned below said cover for engaging the ears of corn as they travel along said rolls, one end of said cover and one end of each of said retarding members being pivotally connected with said supporting frame on a common axis.

17. The combination with a husking implement comprising a supporting frame and a plurality of husking rolls, of a cover extending over said rolls and pivotally supported by said frame so as to be capable of swinging upwardly to afford access to said rolls, a retarding member extending rearwardly below in spaced relation to said cover and adapted to swing therewith, and means yieldingly connecting the rear end portion of said retarding member with said cover for vertical movement relative thereto.

18. The combination with a husking implement comprising a supporting frame and a plurality of husking rolls, of a cover disposed over said rolls and pivotally connected at one end with said frame to swing vertically toward and from said rolls, a plurality of retarding plates supported at one end below said cover to move therewith and relatively thereto, yielding connecting means interposed between the opposite ends of said retarding plates and said cover whereby said plates yieldingly engage the ears of corn as they travel along said rolls, and adjusting mechanism for holding said cover and said retarding plates in different positions relative to said rolls.

19. The combination with a husking implement comprising husking mechanism, of means for guiding the ears of corn to said husking mechanism comprising an alining wheel having a downwardly projecting shoulder for engaging the ears, and means for oscillating said wheel to move the shoulder thereof to and fro along the line of travel of the ears.

20. The combination with a husking machine comprising husking mechanism, of means for guiding the ears of corn to said husking mechanism comprising an alining wheel, said wheel having a forwardly facing shoulder extending downward substantially radially thereof, and means for oscillating said wheel to move the shoulder thereof to and fro along the line of travel of the ears.

21. The combination with a husking machine comprising husking rolls, of means for guiding the ears of corn to said rolls comprising an alining wheel provided with a spirally shaped periphery forming a downwardly extending forwardly facing shoulder adapted to kick back any ears not alining with said rolls, and crank means for oscillating said wheel to move the shoulder thereof to and fro along the line of travel of the ears.

22. In a machine of the class described, the combination with a plurality of husking rolls and a hopper for directing the ears of corn to said rolls, said hopper comprising an end wall, of a transversely extending shaft mounted above said rolls, an alining wheel mounted on said shaft and disposed in an opening in said end wall, said wheel having a downwardly extending forwardly facing shoulder adapted to kick back any ear not in substantial parallelism with said rolls, a crank on said shaft, and means for imparting oscillatory motion to said crank to move said shoulder to and fro along the line of travel of the ears.

23. The combination with a husking implement comprising a supporting frame and a plurality of husking rolls, of a cover pivotally connected with said frame adjacent the receiving end of said husking rolls and adjustably supported over said rolls to swing toward and from the same, means adjacent the discharge end of said rolls for holding said cover in its different positions of adjustment, a plurality of rearwardly extending retarding plates underlying the cover and mounted to swing therewith and to move relatively thereto, and means yieldingly connecting the rear end portions of said plates with said cover, whereby said plates may engage the ears of corn as they travel along said rolls.

24. The combination with a husking implement comprising a supporting frame and a plurality of husking rolls, of a cover pivotally connected at its forward end with said frame to swing toward and from said husking rolls and adjustably supported over said rolls, said cover being flared upwardly at its forward end to form a hopper, means for holding said cover in its different positions of adjustment, a plurality of rearwardly extending retarding plates underlying the cover and mounted to swing therewith and to move relatively thereto, and means yieldingly connecting the rear end portions of said plates with said cover, whereby said plates may engage the ears of corn as they travel along said rolls.

25. The combination with a husking implement comprising a supporting frame and a plurality of husking rolls, of a cover pivotally connected at its forward end with said frame to swing toward and from said husking rolls and adjustably supported over said rolls, said cover being curved upwardly at its forward end to form a hopper, means for holding said cover in its different positions of adjustment, a plurality of rearwardly extending retarding plates underlying the cover and mounted to swing with said cover and to move relatively thereto, said plates having substantially the same curvature as the curved end of the cover, and means yieldingly connecting the rear end portions of said plates with said cover, whereby said plates may engage the ears of corn as they travel along said rolls.

26. The combination with a husking machine comprising a supporting frame and a plurality of husking rolls, of a cover hinged at one end to said frame and having its free end portion extending over said rolls, a plurality of retarding plates underlying the cover and movably connected with the free end portion thereof to retard the travel of the ears of corn along said rolls, adjusting means for holding said cover in different elevated positions relative to said rolls, and means for detachably connecting said cover to said adjusting means, whereby said cover and said retarding plates can be swung upwardly to afford access to said rolls.

LOUIS A. PARADISE.
WILBUR J. COULTAS.